(12) United States Patent
Nedeltchev et al.

(10) Patent No.: US 10,873,540 B2
(45) Date of Patent: Dec. 22, 2020

(54) CROWD-SOURCED CLOUD COMPUTING RESOURCE VALIDATION

(71) Applicant: Cisco Technology, Inc., San Jose, CA (US)

(72) Inventors: Plamen Nedeltchev, San Jose, CA (US); David Delano Ward, Los Gatos, CA (US); Mohit Agrawal, San Jose, CA (US); Alon Shlomo Bernstein, Monte Sereno, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 102 days.

(21) Appl. No.: 15/203,767

(22) Filed: Jul. 6, 2016

(65) Prior Publication Data

US 2018/0013696 A1    Jan. 11, 2018

(51) Int. Cl.
| | |
|---|---|
| H04L 12/911 | (2013.01) |
| G06F 9/50 | (2006.01) |
| H04L 12/26 | (2006.01) |

(52) U.S. Cl.
CPC .......... *H04L 47/822* (2013.01); *G06F 9/5072* (2013.01); *H04L 43/022* (2013.01); *H04L 43/062* (2013.01)

(58) Field of Classification Search
CPC .... H04L 47/822; H04L 43/022; H04L 43/062
See application file for complete search history.

(56) References Cited

U.S. PATENT DOCUMENTS

| | | |
|---|---|---|
| 7,069,560 B1 | 6/2006 | Cheyer |
| 7,515,899 B1 | 4/2009 | Carr et al. |

(Continued)

FOREIGN PATENT DOCUMENTS

| | | |
|---|---|---|
| WO | 0114961 A2 | 3/2001 |
| WO | 2016040889 A1 | 3/2016 |

OTHER PUBLICATIONS

U.S. Appl. No. 14/851,437 to Nedeltchev et al. filed Sep. 11, 2015.

(Continued)

*Primary Examiner* — Patrice L Winder
*Assistant Examiner* — Angela M Widhalm de Rodrig
(74) *Attorney, Agent, or Firm* — Johnson, Marcou, Isaacs & Nix, LLC

(57) ABSTRACT

Resource provider specifications, characterizing computing resources of computing resource providers, are received. The reachability of each IP address included in the received specification is determined. An agent is deployed that is operable to determine the value of each of a set of metrics in the environment of the host at which the agent is deployed. The agent determines the value of each metric of the set of metrics in the environment of the relevant host, and communicates the determined values to one or more computing devices that validate whether the resources characterized by the communicated values are sufficient to provide the performance characterized by the received specification and that each ISP router complies with a predetermined policy. For each computing resource provider validated and determined to comprise an ISP router compliant with policy, the specified computing resources are added to a pool of resources for cloud computing.

20 Claims, 5 Drawing Sheets

(56) References Cited

U.S. PATENT DOCUMENTS

| | | | |
|---|---|---|---|
| 7,870,044 B2 | 1/2011 | Robertson et al. | |
| 8,001,232 B1 | 8/2011 | Saulpaugh | |
| 8,296,765 B2 | 10/2012 | Kurdi et al. | |
| 8,793,313 B2 | 7/2014 | Kern et al. | |
| 8,793,478 B2 | 7/2014 | Jaber et al. | |
| 8,935,366 B2 | 1/2015 | Mehr et al. | |
| 9,401,954 B2 * | 7/2016 | Jagana | H04L 41/5096 |
| 9,485,323 B1 * | 11/2016 | Stickle | H04L 67/32 |
| 9,531,745 B1 * | 12/2016 | Sharma | H04L 63/1433 |
| 9,588,790 B1 * | 3/2017 | Wagner | G06F 9/45533 |
| 9,628,379 B2 | 4/2017 | Nedeltchev et al. | |
| 9,848,041 B2 * | 12/2017 | Einkauf | H04L 67/1076 |
| 10,193,821 B1 * | 1/2019 | Greenwood | H04L 41/0896 |
| 2002/0019844 A1 | 2/2002 | Kurowski et al. | |
| 2003/0115374 A1 | 6/2003 | Waldo et al. | |
| 2005/0081097 A1 | 4/2005 | Bacher et al. | |
| 2006/0031509 A1 | 2/2006 | Ballette et al. | |
| 2007/0276899 A1 | 11/2007 | Martin et al. | |
| 2008/0162637 A1 | 7/2008 | Adamczyk et al. | |
| 2008/0276249 A1 | 11/2008 | Dynarski | |
| 2009/0171855 A1 | 7/2009 | Hubbard et al. | |
| 2009/0265473 A1 | 10/2009 | Hydrie et al. | |
| 2010/0077069 A1 | 3/2010 | Kim et al. | |
| 2010/0248698 A1 | 9/2010 | In et al. | |
| 2010/0281095 A1 | 11/2010 | Wehner et al. | |
| 2011/0055399 A1 | 3/2011 | Tung et al. | |
| 2011/0138047 A1 | 6/2011 | Brown | |
| 2011/0153812 A1 | 6/2011 | Yoon et al. | |
| 2011/0296023 A1 * | 12/2011 | Ferris | G06F 9/5072 709/226 |
| 2012/0198075 A1 | 8/2012 | Crowe et al. | |
| 2012/0246322 A1 | 9/2012 | Patil et al. | |
| 2013/0042004 A1 * | 2/2013 | Boss | G06F 9/5061 709/226 |
| 2013/0174053 A1 | 7/2013 | Torrenegra et al. | |
| 2013/0282446 A1 * | 10/2013 | Dobell | G06Q 10/06398 705/7.42 |
| 2013/0318241 A1 | 11/2013 | Acharya | |
| 2014/0047526 A1 | 2/2014 | Huang et al. | |
| 2015/0007185 A1 | 1/2015 | Mukherjee et al. | |
| 2015/0134396 A1 | 5/2015 | Mukherjee | |
| 2015/0334696 A1 * | 11/2015 | Gu | H04L 67/1095 718/1 |
| 2016/0080477 A1 | 3/2016 | Nedeltchev | |
| 2016/0087940 A1 * | 3/2016 | Miller | G06F 9/45558 726/15 |
| 2016/0140359 A1 | 5/2016 | Mukherjee et al. | |
| 2016/0241486 A1 * | 8/2016 | Jiao | H04L 67/10 |
| 2016/0301661 A1 | 10/2016 | Poirier et al. | |
| 2018/0013696 A1 | 1/2018 | Nedeltchev | |
| 2018/0025399 A1 | 1/2018 | Nedeltchev | |

OTHER PUBLICATIONS

U.S. Appl. No. 15/214,003 to Nedeltchev et al. filed Jul. 19, 2016.
Tran, "Office Action issued U.S. Appl. No. 14/851,437, filed Sep. 11, 2015", dated Jul. 18, 2017, 18 pages.
"How BOINC works", https://boinc.berkeley.edu/wiki/How_BOINC_works, Jul. 21, 2013, 2 pages.
"VXLAN Overview: Cisco Nexus 9000 Series Switches", http://www.cisco.com/c/en/us/products/collateral/switches/nexus-9000-series-switches/white-paper-c11-729383.html, Feb. 15, 2014, 7 pages.
Jariwala, "11 Cloud OS (Operating Systems) you might want to give a try", http://www.techstagram.com/2013/09/19/8-cloud-os/, Sep. 19, 2013, 9 pages.
Mahalingam, et al., "VXLAN: A Framework for Overlaying Virtualized Layer 2 Networks over Layer 3 Networks draft-mahalingam-dutt-dcops-vxlan-02", draft-mahalingam-dutt-dcops-vxlan-02—Virtual eXtensible Local Area Network (VXLAN): A Framework for Overlaying Virtualized Layer 2 Networks, Aug. 22, 2012, 20 pages.
Marosi, et al., "Towards a Volunteer Cloud System", Future Generations Computer System, vol. 29, No. 6, Mar. 27, 2012, pp. 1442-1451.
Verma, et al., "An architecture for Load Balancing Techniques for Fog Computing Environment", vol. 6, No. 2, Apr.-Sep. 2015 pp. 269-274, 6 pages.
Wirtz, "International Search Report and Written Opinion issued in International Application No. PCT/US2015/049823,", dated Jan. 5, 2016, 13 pages.
Wittmann-Regis, "International Preliminary Report on Patentability issued in International Application No. PCT/US2015/049823", dated Mar. 14, 2017, 8 pages.
"Symantec Corporation: E-security begins with sound security policies"", Announcement Symantec, Jun. 14, 2001; XP002265695.
Alecu, "Extended European Search Report for EP 17178569.4;", dated Dec. 22, 2017, 9 pages.
Anonymous:, "Service catalog—Wikipedia," Sep. 14, 2015, pp. 1-5, Retrieved from the Internet: URL:https://en.wikipedia.org/w/index.php?title=Service catalog&oldid=681033936 [retrieved on Nov. 30, 2017].
Dieben, "Extended European Search Report for EP 17180851.2;", dated Dec. 19, 2017, 10 pages.
Airapetian, "Office Action in U.S. Appl. No. 15/214,003", dated Sep. 12, 2018, 11 pages.
U.S. Appl. No. 16/435,338 to Nedeltchev et al. filed Jun. 7, 2019.
"Office Action cited in U.S. Appl. No. 16/435,338, filed Jun. 7, 2019", dated Jul. 27, 2020, 15 pages.

* cited by examiner

300

| 210 - 270 |

Upon determining that the resources characterized by the communicated values of the set of metrics for a given computing resource provider are not sufficient to provide the performance characterized by the received specification for that computing resource provider, requesting, by the one or more computing devices from the given resource provider, a re-registration, of the computing resources of the resource provider
380

| 210 - 280 |
|---|

| For each computing resource provider validated as sufficient to provide the performance characterized by its specification and determined to comprise an ISP router compliant with the predetermined policy, determine and report on an ongoing basis, by at least one agent deployed to a host of the computing resource provider to the one or more computing devices, the value of each metric of the set of metrics in the environment of the host at which the at least one agent is deployed 490 |
|---|

FIG. 4

CROWD-SOURCED CLOUD COMPUTING RESOURCE VALIDATION

TECHNICAL FIELD

The disclosed technology relates to delivery of computing as a service. In particular, example embodiments relate to adding resources to a pool of resources available in a crowd-sourced cloud.

BACKGROUND

"Cloud computing" refers to a model for enabling ubiquitous, convenient, on-demand network access to a shared pool of configurable computing resources (e.g., networks, servers, storage, applications, and services) that may be rapidly provisioned and released with minimal management effort or service provider interaction. The cloud computing model is characterized by on-demand self-service, broad network access, resource pooling, rapid elasticity, and measured service. Cloud computing service models include software as a service (SaaS), platform as a service (PaaS), and infrastructure as a service (IaaS), Data as a Service (DaaS) and Analytics as a Service (AaaS). Cloud computing deployment models include public clouds, private clouds, community clouds, and hybrid combinations thereof. The cloud model can allow end users to reduce capital expenditures and burdensome operating costs associated with maintaining substantial information technology expertise and operating staff in house.

BRIEF DESCRIPTION OF THE DRAWINGS

FIG. 3 is a block flow diagram depicting methods of validating resources for inclusion in a crowd-sourced cloud, in accordance with certain example embodiments.

FIG. 4 is a block flow diagram depicting methods of validating resources for inclusion in a crowd-sourced cloud, in accordance with certain example embodiments.

DETAILED DESCRIPTION OF EXAMPLE EMBODIMENTS

Figure 1:
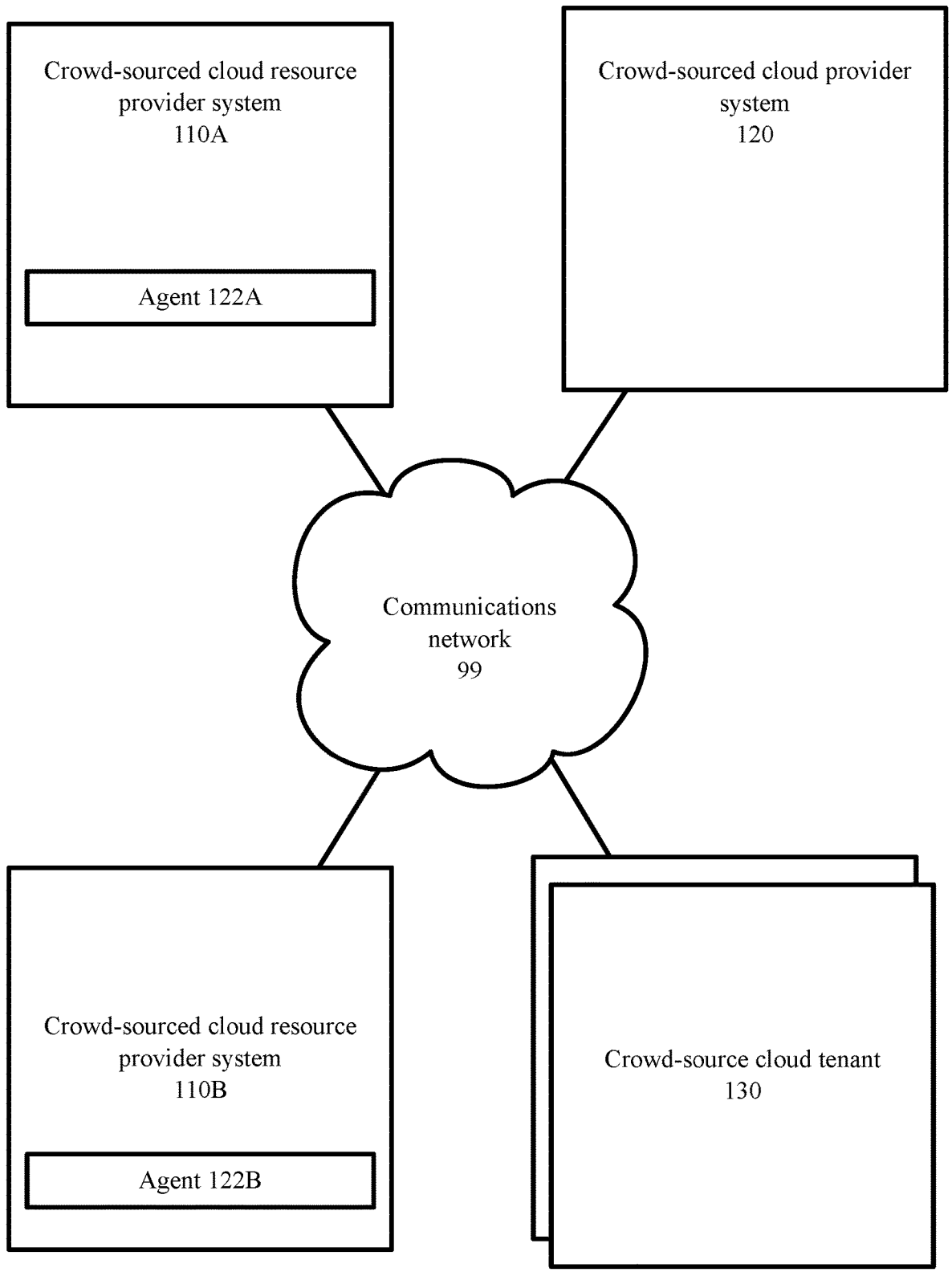
FIG. 1 is a block diagram depicting a communications and processing architecture for a crowd-sourced cloud, in accordance with certain example embodiments.

Crowd-sourced cloud computing introduces a new cloud computing deployment model involving a cloud provider and multiple cloud resource providers. In such a model, computing resources of each of multiple resource providers, such as residential subscribers to an Internet Service Provider (ISP), are logically partitioned into a resource provider end user partition and a resource provider crowd-sourced cloud partition. One or more crowd-sourced cloud agents are installed in each crowd-sourced resource provider partition. Orchestration of the crowd-sourced cloud can proceed in a cloud provider computing system and in each agent. Orchestration can include: registering (using both the crowd-sourced cloud provider computing systems and the agents) at least one resource of a resource provider with the crowd-sourced cloud provider computing system; validating the registered resources as being available for provisioning to meet service requests from crowd-sourced cloud tenants; publishing each registered service as available to potential tenants; receiving a request for crowd-sourced cloud services by the cloud provider computing system; provisioning the requested services; and operating each provisioned service.

Typical network architectures may be designed for centralized and static, location-specific, client-server ("north-south") environments. Such networks may be designed for traffic patterns originating from the corporate network environment and that primarily traverse a corporate network edge. Such an approach may enable service offerings, including cloud services, from centralized data center ("DC") locations to remote branch partner or home locations. While "home" is used for simplicity in the present disclosure, other entities such as businesses, schools, and universities, could all participate in a crowd-sourced cloud as service providers. These entities can provide computing resources that can provide compute, network, or storage capacity in a context of space, power, and cooling. For example, as the computing power of vehicles increases, vehicles may be able to participate in a crowd-sourced cloud as providers of services and capacity.

Real-time communications and peer-to-peer traffic patterns are increasingly mobile, and applications are increasingly cloud-based. That design changes the typical traffic patterns from north-south to more bidirectional "east-west," and allows a service provider to offer mobile services from large cloud locations. In 2018, it is expected that up to 60% of data may be resident in decentralized computing with the combination of DC-based data, public clouds, and hybrid clouds.

At the same time, the power of traditional end user environments (south) is exploding. Some estimate that the compute power of the equivalent of a personal computer, such as found in the typical home environment, in 2049 may be equal to all computing power created through 2012. Further, the ability of home environments to offer services and products (south-to-north, south-to-west, and south-to-east traffic) may expand; similarly to how people offer home-generated electrical power to public utilities. This trend opens the door for a form of computing where the consumer can share the excess of his home cloud or IT infrastructure with peers, ISPs, application providers, or third parties. This capability effectively may transform the consumer of goods and services into a "prosumer"—a market resident who owns a home infrastructure and allocates part of it to create a cloud and offer services and products to peers, ISPs, application providers, or third parties. In some embodiments, it allows customers to become entrepreneurs and de-facto application providers and/or crowd-sourced public cloud providers.

Typical data center based clouds undergo a lengthy, and mostly manual, process of certifying/validating physical resources before making those resources available for provisioning to respond to a tenant's request for services. One challenge in such a crowd-sourced cloud computing architecture is to validate that the resources that have been registered (possibly through a self-service registration portal by millions of independent resource providers), are, in fact, available for provisioning in response to service requests. Embodiments of the disclosed technology can provide such validation using both the cloud provider computing system and agents deployed among the registered resources.

Example System Architectures

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

As depicted in FIG. 1, the architecture 100 includes network computing devices 110, 120, and 130, each of which may be configured to communicate with one another via communications network 99. Network computing device(s) 110 can include one or more crowd-sourced cloud agents 122A, 122B for participation as a provider of computing resources in a crowd-sourced cloud. In some embodiments, a user associated with a device must install an application and/or make a feature selection to obtain the benefits of the technology described herein.

Network 99 includes one or more wired or wireless telecommunications systems by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over the network 99. For example, each network device can include a server, or a partition of a server, router VM or container, a portion of a router, a desktop computer, a laptop computer, a tablet computer, a television with one or more processors embedded therein and/or coupled thereto, a smart phone, a handheld computer, a personal digital assistant (PDA), or any other wired or wireless processor-driven device. In some embodiments, the network device 110 may be a partition on an resource provider's computing resource, the network device 120 may be system operated by an ISP or other crowd-sourced cloud service provider, and the network device 130 may be a crowd-sourced cloud tenant system.

The network connections illustrated are example and other approaches for establishing a communications link between the computers and devices can be used. Additionally, those having ordinary skill in the art having the benefit of this disclosure will appreciate that the network devices illustrated in FIG. 1 may have any of several other suitable computer system configurations. For example, one or both of network device 110 and network device 130 can be embodied as a mobile phone or handheld computer, and may not include all the components described above.

Figure 5:
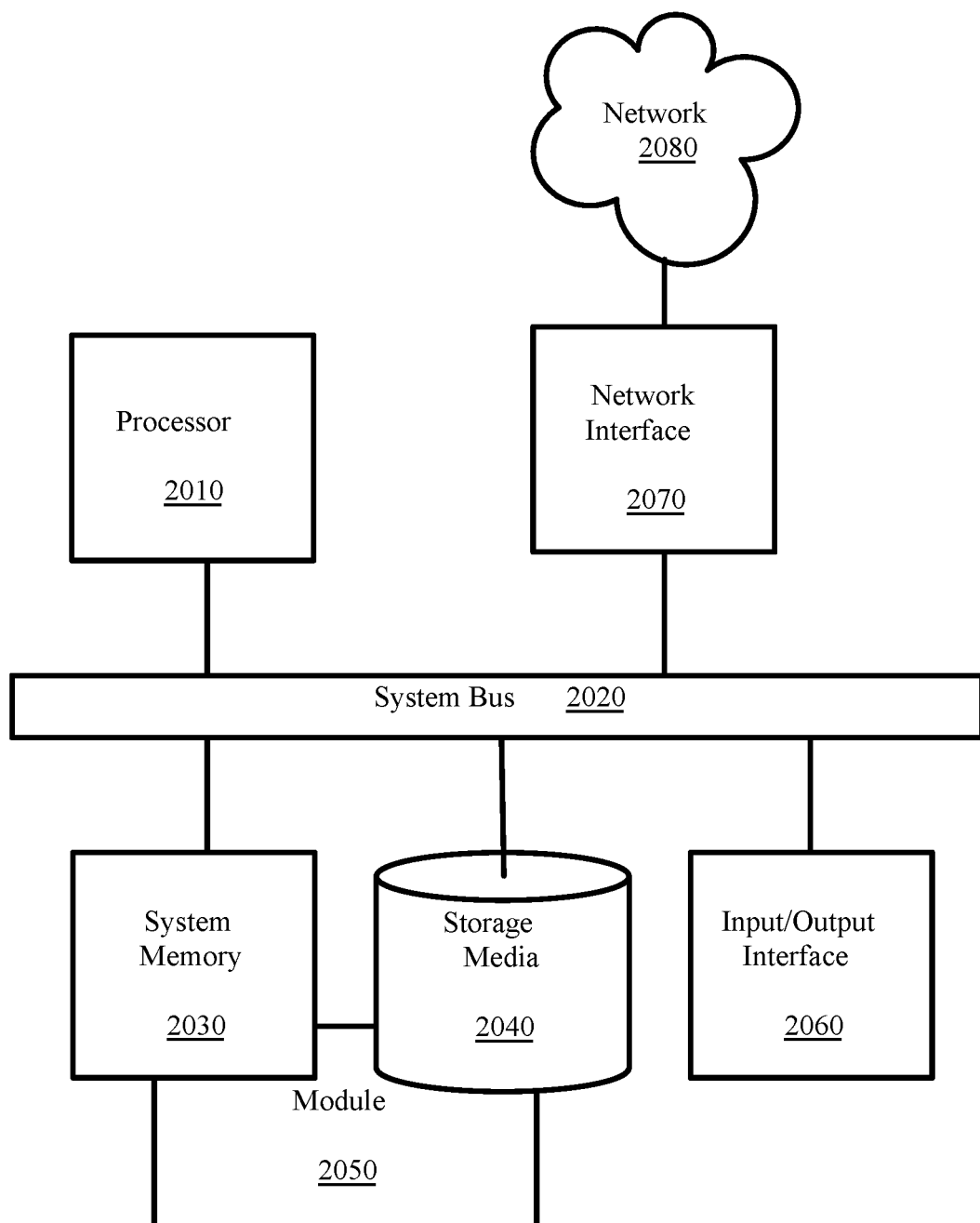
FIG. 5 is a diagram depicting a computing machine and a module, in accordance with certain example embodiments.

In example embodiments, the network computing devices, and any other computing machines associated with the technology presented herein, may be any type of computing machine such as, but not limited to, those discussed in more detail with respect to FIG. 5. Furthermore, any functions, applications, or modules associated with any of these computing machines, such as those described herein or any others (for example scripts, web content, software, firmware, or hardware) associated with the technology presented herein may by any of the modules discussed in more detail with respect to FIG. 5. The computing machines discussed herein may communicate with one another as well as other computing machines or communication systems over one or more networks, such as network 99. The network 99 may include any type of data or communications network, including any of the network technology discussed with respect to FIG. 5.

Example Embodiments

The example embodiments illustrated in the following figures are described hereinafter with respect to the components of the example operating environment and example architecture described elsewhere herein. The example embodiments may also be practiced with other systems and in other environments.

Figure 2:
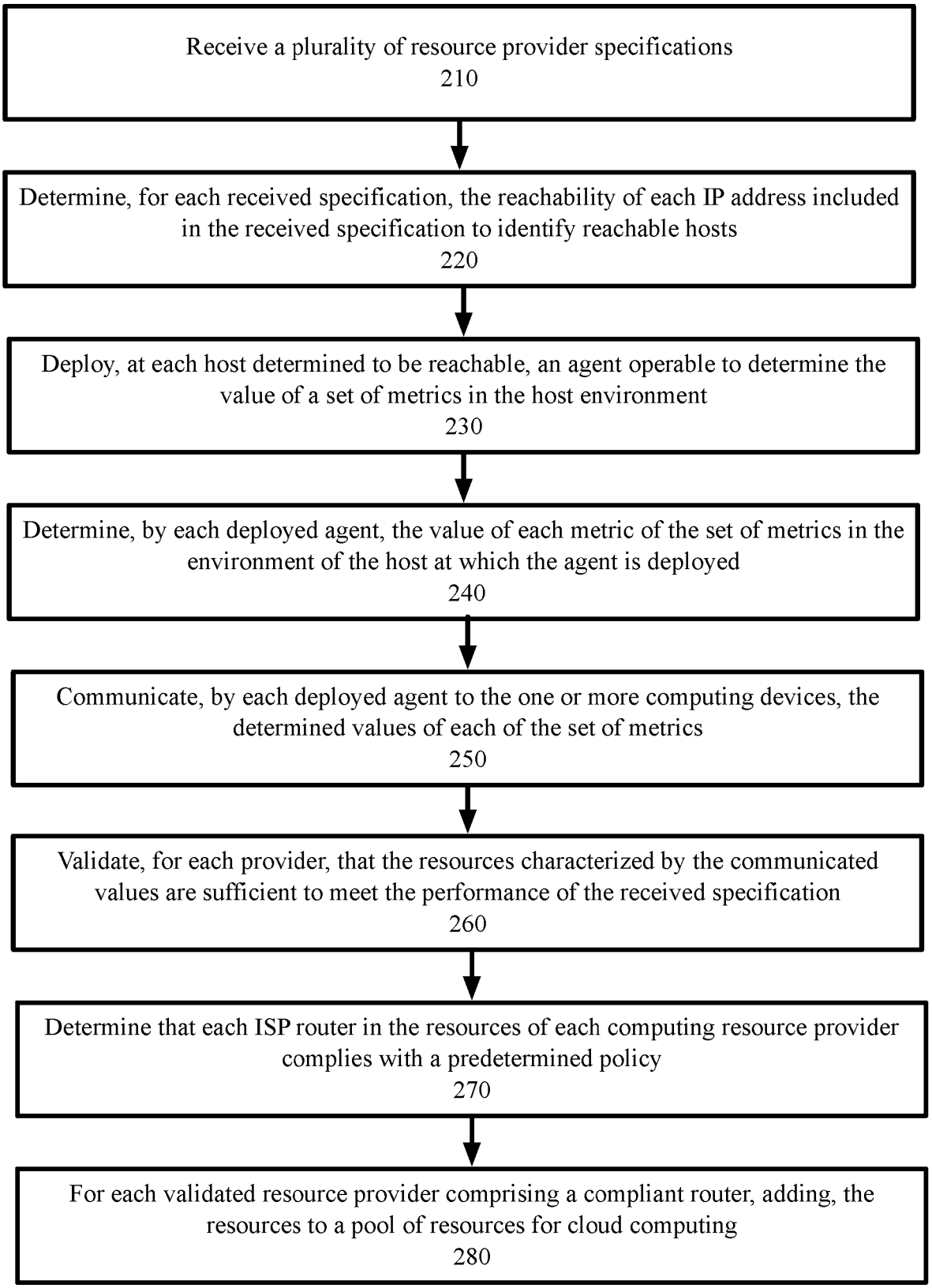
FIG. 2 is a block flow diagram depicting methods of validating resources for inclusion in a crowd-sourced cloud, in accordance with certain example embodiments.

Referring to FIG. 2, and continuing to refer to FIG. 1 for context, a block flow diagram depicting a method 200 to validate resources for a crowd-sourced cloud is shown, in accordance with certain example embodiments. In such a method 200, multiple resource provider specifications are received by one or more computing devices such as the cloud provider system 120—Block 210. Each received specification characterizes the registered computing resources of one of multiple computing resource providers. The computing resources have been registered for participation in a cloud computing service. For example, a residential customer of an ISP can register, using a self-service portal, a portion of the customer's resources as available for participation in a crowd-sourced cloud operated by the ISP via a cloud provider system 120 over network 99. Each received specification can include values for each of multiple parameters characterizing the resources of the computing resource provider. The values can include at least one host Internet Protocol (IP) address and at least one Internet Service Provider (ISP) router IP address.

Consider, as a continuing example, two crowd-sourced cloud resource providers—Provider A and Provider B. Provider A has registered resources of crowd-sourced cloud resource provider system 110A with crowd-sourced cloud provider system 120. Provider B has registered resources of crowd-sourced cloud resource provider system 110B with crowd-sourced cloud provider system 120. Table 1 presents the specifications for the registered resources of Provider A and Provider B. The parameters and values presented in Table 1 are examples.

TABLE 1

| Parameter | Provider A | Provider B |
|---|---|---|
| Address | 123 ABC Lane, San Jose, USA | 123 XYZ Tower, San Jose, USA |
| Resources | 2 CPUs, 1 TFLOPS, 4 GB RAM, 20 GB storage, 2 Mbps up & down, | 2 CPUs, 1 TFLOPS, 8 GB RAM, 20 GB storage, 4 Mbps up & down |
| Servers | 2 | 3 |
| Connectivity | 10.1.1.1, 10.1.1.2 | 10.2.1.1, 10.2.1.2, 10.2.1.3 |
| Internet Service Provider | ISP #1, router IP address 10.1.1.0 | ISP #1, router IP address 10.2.1.0 |
| Service Level | 50% available, dedicated resources allocation policy per server, no add-on resource flexibility | 70% available, flexible resource allocation policy, add-on resource flexibility |

TABLE 1-continued

| Parameter | Provider A | Provider B |
|---|---|---|
| Allocation | Split ratio 1:1 | Best effort |
| Add On Resource Limit | N/A | 20% CPU, 20% RAM, 20% storage |
| Operating System Version | Linux, Linux | Windows 8, Linux, Linux |

The reachability of each IP address included in the specification is determined—Block 220—for example, by the cloud provider system 120. A "reachable" IP address is one to/from which a network path has been demonstrated to be available. In the continuing example, the crowd-sourced cloud provider system 120 determines the reachability of Provider A IP addresses by pinging router IP address (10.1.1.0) and both server IP addresses (10.1.1.1, 10.1.1.2) over network 99. The crowd-sourced cloud provider system 120 determines the reachability of Provider B IP addresses by pinging router IP address (10.2.1.0), and by pinging each server IP address (10.2.1.1, 10.2.1.2, 10.2.1.3). In the continuing example, all IP addresses are determined to be reachable.

An agent is deployed at each host that is determined to be reachable, with each agent being operable to determine a value of each of a set of metrics in the environment of the host at which the agent is deployed—Block 230. An agent is a network management software module that resides on a managed device. An agent has local knowledge of, and can request, management information from devices that are reachable from the agent. The set of metrics is a subset of the received resource specification parameters, though the agent can be configured to request and receive any information available from a network device reachable from the agent. In the continuing example, the crowd-sourced cloud provider system 120 remotely deploys an agent 122A to each server (host IP addresses 10.1.1.1, 10.1.1.2) of resource provider system 110A. The crowd-sourced cloud provider system 120 remotely deploys an agent 122B to each server (host IP addresses 10.2.1.1, 10.2.1.2, 10.2.1.3) of resource provider system 110B. In other embodiments, the cloud resource provider can install one or more agents on each reachable host.

Each deployed agent can determine the value of each metric of the set of metrics in the environment of the host at which the agent is deployed—Block 240. In the continuing example, for the resources of Provider A, one of the deployed agents 122A will confirm the configuration of Provider A's router at 10.1.1.0, for example, by communicating with the router at 10.1.1.0 using commands specified by the router's manufacturer under a network management protocol such as Simple Network Management Protocol (SNMP). SNMP is a component of the Internet Protocol Suite as defined by the Internet Engineering Task Force (IETF) in a set of standards for network management, including an application layer protocol, a database schema, and a set of data objects.

Based on the response provided by the router, the agent 122A determines that router 10.1.1.0 is configured for Network Address Translation (NAT), identifies the Domain Name System (DNS) utilized by router 10.1.1.0, identifies the availability metrics of router 10.1.1.0 (for example, 99.9% up each day), identifies the home-device connectivity configuration of router 10.1.1.0, and identifies the number of IP addresses available through router 10.1.1.0.

An agent 122A deployed at each Provider A host determines the OS version operating on host, samples resource utilization (5 samples over 30 second intervals—though other sample sizes and intervals can be used) for the host CPU(s), memory, and bandwidth, and determines the resource capacity at the host, for example by querying the operating system of the host. TABLE 2 shows the results of the agent 122A determination for Provider A host 10.1.1.1 and Provider A host 10.1.1.2. The agents 122B deployed at each Provider B host assess the same parameters for each Provider B host.

Each deployed agent communicates the determined values of each of the set of metrics to the one or more computing devices such as the cloud provider system 120—Block 250. In the continuing example, each agent 122A, 122B, communicates the determined values to the crowd-sourced cloud provider system 120 via the communications network 99.

For each resource provider system, the received values of the set of metrics for the resource provider are compared to the received specification for that computing resource provider to validate that the provider's registered resources are sufficient to provide the performance characterized by the received specification for that computing resource provider—Block 260. In the continuing example, based on the "split ratio 1:1" allocation policy for Provider A (meaning that the total specified resources are expected to be evenly allocated to Provider A's hosts, and that the specified resources are dedicated at the specified SLA), the combined measured resources for Provider A hosts are sufficient to meet the specified Provider A resources.

TABLE 2

| Parameter | Provider A - Specified | Provider A - Measured 10.1.1.1 | Provider A - Measured 10.1.1.2 |
|---|---|---|---|
| Address | 123 ABC Lane, San Jose, USA | | |
| Resources | 2 CPUs, 1 TFLOPS, 4 GB RAM, 20 GB storage, 2 Mbps up & down, | 2 CPUs, 0.8 TFLOPS, 4 GB RAM, 100 GB storage, 36 Mbps up & 5 Mbps down | 3 CPUs, 0.8 TFLOPS, 3 GB RAM, 100 GB storage and 36 Mbps up & 5 Mbps down |
| Servers | 2 | — | — |
| Connectivity | 10.1.1.1, 10.1.1.2 | 10.1.1.1 | 10.1.1.2 |
| Internet Service Provider | ISP #1, router IP address 10.1.1.0 | ISP #1, router IP address 10.2.1.0 | ISP #1, router IP address 10.2.1.0 |
| Service Level | 50% available, dedicated resources allocation policy per server, no-add-on | | |
| Allocation | Split ratio 1:1 | | |
| Add On Resource Limit | N/A | 20% CPU, 20% RAM, 20% storage | |
| Operating System Version | Linux, Linux | Linux | Linux |

The process works similarly for Provider B resources; however, Provider B's specification indicates a "best effort" allocation policy. Under a "best effort" allocation policy, the requested resources are allocated if available; otherwise, the request is placed in a first-in-first-out (FIFO) queue. This allocation means that the process will not expect fixed resources availability per host for Provider B. Instead, the process will check if all Provider B hosts (10.2.1.1, 10.2.1.2, 10.2.1.3) cumulatively have registered resources plus sufficient resources to meet the specified "add on" resource limit.

In the continuing example, Provider B registered to provide 8 GB RAM. It was measured that Provider B's host 10.2.1.1 includes 4 GB RAM, Provider B's host 10.2.1.2 includes 2 GB RAM, and Provider B's host 10.2.1.2 includes 2 GB RAM. Provider B will not validate, since the cumulative RAM of all three Provider B hosts servers is 8 GB. While this it the amount of RAM that was registered, Provider B's specification also calls for an "add on" resource limit of 20% for RAM. Accordingly, total cumulative RAM of all three hosts (10.2.1.1, 10.2.1.2, and 10.2.1.3) should be 8 GB+8 GB*0.2=9.6 GB RAM.

For each resource provider system, the process determines whether each ISP router complies with a predetermined policy—Block 270. The policy is configurable, for example by the operator of the crowd-sourced cloud provider system 120. In the continuing example, for the ISP router of each of Provider A and Provider B, the appropriate agent 122 or the crowd-sourced cloud provider system 120 checks whether NAT is available on the ISP router, for example, by using the ISP router's SNMP command interface. The process also checks that a predetermined number of IP addresses are available through the router. For example, at least six IP addresses should be available via Provider A's ISP router if a 3-tier web/application/database architecture of containers may be deployed on each of Provider A's two servers. The process can check for the ability to configure a VXLAN network on the ISP router. Each interaction between an agent and the ISP router can be through the ISP router's SNMP command interface.

For each computing resource provider validated as sufficient to provide the performance characterized by its specification and determined to comprise an ISP router compliant with the predetermined policy, the specified computing resources of the computing resource provider are added to a pool of resources for cloud computing—Block 280. In the continuing example, Provider A's crowd-sourced cloud resources 110A are added to the pool of crowd-sourced cloud provider system 120 resources, but Provider B's resources 110B are not added.

Referring to FIG. 3, and continuing to refer to prior figures for context, a block flow diagram depicting a method 300 to validate resources for a crowd-sourced cloud is shown, in accordance with certain example embodiments. In such methods 300, Blocks 210-270 are performed as described above.

For each computing resource provider not validated as sufficient to provide the performance characterized by its specification and/or determined not to comprise an ISP router compliant with the predetermined policy, the process requests, from the given resource provider, a reregistration of the computing resources of the resource provider—Block 380. In the continuing example, the cloud provider system 120 requests, through an agent 122B that Provider B's resource provider system 110B reregister Provider B's computing resources. In some embodiments, the agent 122B presents the measured characteristics of Provider B's resources as a starting point for reregistration. In some embodiments, only those aspects of Provider B's resource specification that were a "but for" cause of failing to validate are presented in the request for reregistration. In the continuing example, the "add on" resource limit, specifically the RAM "add on" resource limit, is presented to Provider B by agent 122B for editing as part of reregistration.

Referring to FIG. 4, and continuing to refer to prior figures for context, a block flow diagram depicting a method 400 to validate resources for a crowd-sourced cloud is shown, in accordance with certain example embodiments. In such methods 400, Blocks 210-280 are performed as described above. In such methods, for each computing resource provider: 1) validated as sufficient to provide the performance characterized by its specification; and 2) determined to comprise an ISP router compliant with the predetermined policy, the process determines and reports (on an ongoing basis) the value of a subset of the set of metrics in the environment of the host at which the at least one agent is deployed—Block 490. In the continuing example, each agent 112A deployed at a host of Provider A periodically determines the value of Provider A resources and resource usage, and reports the values to the cloud provider system 120, in a fashion similar to the process described previously with reference to Block 240.

After each of Blocks 280, 380, and 490, the crowd-sourced cloud provider system 120, publishes each validated and registered service as available to potential tenants; receives a request for crowd-sourced cloud services from a potential tenant; provisions the requested services; and operates each provisioned service.

Other Example Embodiments

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Additionally, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and computer program products described herein address the challenges associated with adding resources from a plurality of small providers to a crowd-sourced computing cloud by providing an automated approach to validation of registered resources. Absent such an approach, the technical challenge of validating a large plurality of resources registered by typically inexperienced providers (providers who are not typically information technology professionals) would be difficult to overcome.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A method, comprising:
    receiving, by one or more computing devices, a plurality of resource provider specifications:
        wherein each received specification characterizes computing resources of one of a plurality of computing resource providers, the computing resources having been registered for participation in a cloud computing service but not part of a pool of resources available for the cloud computing service, the computing resources comprising at least one host and one Internet Service Provider (ISP) router, and each received specification comprises one or more values for each of a plurality of resource specification parameters including an Internet Protocol (IP) address for each specified host, an IP address for each specified Internet Service Provider (ISP) router, a processing capacity of the resources, a storage capacity of the resources, and a communication capacity of the ISP link to the resources;
    determining, by the one or more computing devices for each received specification, a reachability of each IP address included in the received specification;
    deploying, by the one or more computing devices and at each host determined to be reachable, an agent operable to determine a value of each of a set of metrics in an environment of the host at which the agent is deployed, wherein the set of metrics comprises a subset of the received resource specification parameters;
    determining, by each deployed agent, the value of each metric of the set of metrics in the environment of the host at which the agent is deployed;
    communicating, by each deployed agent to the one or more computing devices, the determined values of each of the set of metrics;
    validating, by the one or more computing devices and for each computing resource provider, the received specification, wherein the validation comprises a comparison of the received specification for each computing resource provider to the set of metrics for the computing resource provider to determine that the resources characterized by the communicated values of the set of metrics for the computing resource provider are sufficient to provide the performance characterized by the received specification for that computing resource provider;
    determining, by the one or more computing devices, that each ISP router in the resources of each computing resource provider complies with a predetermined policy; and
    for each computing resource provider validated as sufficient to provide the performance characterized by its specification and determined to comprise an ISP router compliant with the predetermined policy, adding, by the one or more computer devices, the specified computing resources of the computing resource provider to the pool of resources for cloud computing.

2. The method of claim 1, wherein each resource provider specification is received from a crowd-sourced cloud registration server of the cloud computing service.

3. The method of claim 1, wherein the set of metrics includes an operating system version of each host, resource utilization metrics of each host, and a resources capacity for each host.

4. The method of claim 1, further comprising:
upon determining that the resources characterized by the communicated values of the set of metrics for a given computing resource provider are not sufficient to provide the performance characterized by the received specification for that computing resource provider, requesting, by the one or more computing devices from the given resource provider, a reregistration of the computing resources of the resource provider, wherein the reregistration request is comprised of the resource specification parameters of the received specification that are not sufficient to provide the performance characterized by the received specification.

5. The method of claim 1, further comprising:
for each computing resource provider validated as sufficient to provide the performance characterized by its specification and determined to comprise an ISP router compliant with the predetermined policy, determine and report on an ongoing basis, by at least one agent deployed to a host of the computing resource provider to the one or more computing devices, the value of each metric of the set of metrics in the environment of the host at which the at least one agent is deployed.

6. The method of claim 1, wherein determining that each ISP router in the resources of each computing resource provider complies with a predetermined policy comprises at least one of:
determining that network address translation (NAT) is available at each ISP router in the resources of each computing resource provider; and
determining a number of IP addresses available at each ISP router in the resources of each computing resource provider.

7. The method of claim 1, wherein the resources of each computing resource provider comprise ISP residential customer compute, store, and network resources.

8. A computer program product, comprising:
one or more tangible media with logic encoded thereon that when executed by a computer cause the computer to be operable to:
receive, by one or more computing devices, a plurality of resource provider specifications:
wherein each received specification characterizes computing resources of one of a plurality of computing resource providers, the computing resources having been registered for participation in a cloud computing service but not part of a pool of resources available for the cloud computing service, the computing resources comprising at least one host and one Internet Service Provider (ISP) router, and each received specification comprises one or more values for each of a plurality of resource specification parameters including an Internet Protocol (IP) address for each specified host and for each specified Internet Service Provider (ISP) router;
determine, by the one or more computing devices for each received specification, a reachability of each IP address included in the received specification;
deploy, by the one or more computing devices and at each host determined to be reachable, an agent operable to determine a value of each of a set of metrics in an environment of the host at which the agent is deployed, wherein the set of metrics comprises a subset of the received resource specification parameters;
determine, by each deployed agent, the value of each metric of the set of metrics in the environment of the host at which the agent is deployed;
communicate, by each deployed agent to the one or more computing devices, the determined values of each of the set of metrics;
validate, by the one or more computing devices and for each computing resource provider, the received specification, wherein the validation comprises a comparison of the received specification for each computing resource provider to the set of metrics for the computing resource provider to determine that the resources characterized by the communicated values of the set of metrics for the computing resource provider are sufficient to provide the performance characterized by the received specification for that computing resource provider;
determine, by the one or more computing devices, that each ISP router in the resources of each computing resource provider complies with a predetermined policy; and
for each computing resource provider validated as sufficient to provide the performance characterized by its specification and determined to comprise an ISP router compliant with the predetermined policy, add, by the one or more computer devices, the specified computing resources of the computing resource provider to the pool of resources for cloud computing.

9. The computer program product of claim 8, wherein each resource provider specification is received from a crowd-sourced cloud registration server of the cloud computing service.

10. The computer program product of claim 8, wherein the set of metrics includes an operating system version of each host, resource utilization metrics of each host, and a resources capacity for each host.

11. The computer program product of claim 8, further comprising:
upon determining that the resources characterized by the communicated values of the set of metrics for a given computing resource provider are not sufficient to provide the performance characterized by the received specification for that computing resource provider, requesting, by the one or more computing devices from the given resource provider, a reregistration of the computing resources of the resource provider, wherein the reregistration request is comprised of the resource specification parameters of the received specification that are not sufficient to provide the performance characterized by the received specification.

12. The computer program product of claim 8, further comprising:
for each computing resource provider validated as sufficient to provide the performance characterized by its specification and determined to comprise an ISP router compliant with the predetermined policy, determining and reporting on an ongoing basis, by at least one agent deployed to a host of the computing resource provider to the one or more computing devices, the value of each metric of the set of metrics in the environment of the host at which the at least one agent is deployed.

13. The computer program product of claim 8, wherein determining that each ISP router in the resources of each computing resource provider complies with a predetermined policy comprises at least one of:
determining that network address translation (NAT) is available at each ISP router in the resources of each computing resource provider; and determining a number of IP addresses available at each ISP router in the resources of each computing resource provider.

14. The computer program product of claim 8, wherein the resources of each computing resource provider comprise ISP residential customer compute, store, and network resources.

15. A system, comprising:
a storage device; and
a processor communicatively coupled to the storage device, wherein the processor executes application code instructions that are stored in the storage device to cause the system to:
receive, by one or more computing devices, a plurality of resource provider specifications:
wherein each received specification characterizes computing resources of one of a plurality of computing resource providers, the computing resources having been registered for participation in a cloud computing service but not part of a pool of resources available for the cloud computing service, the computing resources comprising at least one host and one Internet Service Provider (ISP) router, and each received specification comprises one or more values for each of a plurality of resource specification parameters including an Internet Protocol (IP) address for each specified host and for each specified Internet Service Provider (ISP) router;
determine, by the one or more computing devices for each received specification, a reachability of each IP address included in the received specification;
deploy, by the one or more computing devices and at each host determined to be reachable, an agent operable to determine a value of each of a set of metrics in an environment of the host at which the agent is deployed, wherein the set of metrics comprise a subset of the received resource specification parameters;
determine, by each deployed agent, the value of each metric of the set of metrics in the environment of the host at which the agent is deployed;
communicate, by each deployed agent to the one or more computing devices, the determined values of each of the set of metrics;
validate, by the one or more computing devices, for each computing resource provider, the received specification, wherein the validation comprises a comparison of the received specification for each computing resource provider to the set of metrics for the computing resource provider to determine that the resources characterized by the communicated values of the set of metrics for the computing resource provider are sufficient to provide the performance characterized by the received specification for that computing resource provider;
determine, by the one or more computing devices, that each ISP router in the resources of each computing resource provider complies with a predetermined policy; and
for each computing resource provider validated as sufficient to provide the performance characterized by its specification and determined to comprise an ISP router compliant with the predetermined policy, add, by the one or more computer devices, the specified computing resources of the computing resource provider to the pool of resources for cloud computing.

16. The system of claim 15, wherein each resource provider specification is received from a crowd-sourced cloud registration server of the cloud computing service.

17. The system of claim 15, wherein the processor father executes application code instructions that are stored in the storage device to cause the system to:
upon determining that the resources characterized by the communicated values of the set of metrics for a given computing resource provider are not sufficient to provide the performance characterized by the received specification for that computing resource provider, request, by the one or more computing devices from the given resource provider, a reregistration of the computing resources of the resource provider, wherein the reregistration request is comprised of the resource specification parameters of the received specification that are not sufficient to provide the performance characterized by the received specification.

18. The system of claim 15, wherein the processor further executes application code instructions that are stored in the storage device to cause the system to:
for each computing resource provider validated as sufficient to provide the performance characterized by its specification and determined to comprise an ISP router compliant with the predetermined policy, determine and report on an ongoing basis, by at least one agent deployed to a host of the computing resource provider to the one or more computing devices, the value of each metric of the set of metrics in the environment of the host at which the at least one agent is deployed.

19. The system of claim 15, wherein determining that each ISP router in the resources of each computing resource provider complies with the predetermined policy comprises at least one of:
determining that network address translation (NAT) is available at each ISP router in the resources of each computing resource provider; and
determining a number of IP addresses available at each ISP router in the resources of each computing resource provider.

20. The system of claim 15, wherein the resources of each computing resource provider comprise ISP residential customer compute, store, and network resources.

* * * * *